June 21, 1966  R. M. SISK ETAL  3,257,156
CABLE RETRACTOR
Filed Jan. 28, 1964

INVENTORS
RICHARD M. SISK
JONAS M. SHAPIRO
BY ROBERT VESCIGLIO
Alfred E. Miller and Daniel Jay Tick
ATTORNEYS __United States Patent Office__

3,257,156
Patented June 21, 1966

3,257,156
CABLE RETRACTOR
Richard M. Sisk, South Norwalk, Robert Vesciglio, Westport, and Jonas M. Shapiro, Stamford, Conn., and Theodore Watkin, 43 Hazelwood Lane, Stamford, Conn.; said Sisk, said Vesciglio, and said Shapiro, assignors to Manson Laboratories, Incorporated, Stamford, Conn., a corporation of Connecticut
Filed Jan. 28, 1964, Ser. No. 340,606
8 Claims. (Cl. 312—273)

The present application is a continuation-in-part application of pending application, Serial No. 283,226, filed May 27, 1963 and entitled "Electronic Equipment Mounting and Housing Arrangements."

The present invention relates to equipment mounting and housing arrangements. More particularly, the invention relates to a cable retractor adapted to be utilized with a mounting arrangement for electronic equipment and a cable support for supporting a flexible cable in disentangled form.

The mounting arrangement is fully integrated and includes an automatic cable retractor.

An object of the present invention is to provide an equipment mounting arrangement which prevents cable and/or wire damage and entanglement.

An object of the present invention is to provide a new and improved cable retractor.

An object of the present invention is to provide a new and improved cable retractor for a mounting arrangement for electronic equipment.

An object of the present invention is to provide an efficient cable retractor.

An object of the present invention is to provide a cable retractor which is of simple but sturdy structure.

An object of the present invention is to provide a new and improved cable support for supporting a flexible cable in disentangled form.

An object of the present invention is to provide a cable support for supporting a flexible cable in disentangled form effectively, efficiently, reliably and with a simple structure.

In accordance with the present invention, the cable retractor comprises a pair of pivotally mounted arms each having two end portions and pivotally affixed to each other at a first end portion of each of the arms. The second end portion of one of the arms is pivotally affixed to a side of the casing and the second end portion of the other of the arms is pivotally affixed to a slidably mounted support arm of the mounting arrangement. The cable support for supporting a flexible cable in disentangled form includes a resilient wire arrangement having spaced arms extending from a common point, one of the arms being affixed to a first support area and the other of the arms being affixed to a second support area, the cable support supporting the cable at fixed points thereof.

In order that the present invention may be readily carried into effect, it will now be described with reference to the accompanying drawings, wherein.

In the figures, the same components are indicated by the same reference numerals.

Figure 3:
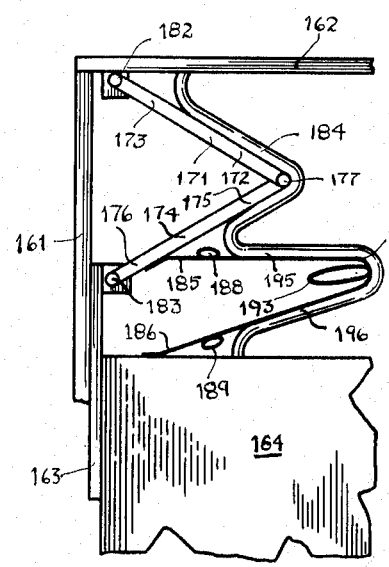
FIG. 3 is a top view of the embodiment of FIG. 1 utilized with a cable retractor of the present invention.
Figure 4:
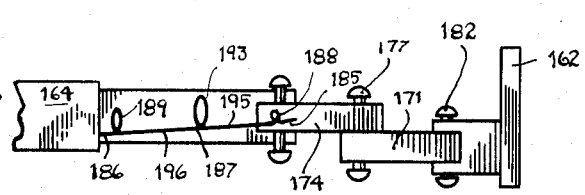
FIG. 4 is a side view of the arrangement of FIG. 3.

In FIGS. 3 and 4, a casing has spaced opposite substantially parallel sides, only one of which, 161, is shown in FIG. 3, and a back 162 substantially perpendicular to the sides and joined at one end to one side and joined at the other end to the other side. A pair of support arms, only one of which, 163, is shown in FIG. 3, support an equipment unit 164 between them. The support arm 163 is slidably mounted on the side 161 and the other of the support arms, not shown, is slidably mounted on the other of the sides, not shown, with each support arm in substantially adjacent and parallel relation to the corresponding side and slidable in directions toward and away from the back 162 of the casing. Any suitable mounting arrangement may be utilized to slidably mount the support arms on the corresponding sides of the casing. The casing, including the support arms and mounting arrangements, may be identical with or at least similar to, the casing, support arms and mounting arrangement disclosed and illustrated in FIG. 6, or FIG. 8, or FIG. 10 of copending Serial No. 283,226.

A cable retractor such as, for example, that of FIGS. 8 and 9 of copending application Serial No. 283,226, may be utilized with the casing and equipment unit 164 of FIGS. 3 and 4. The cable retractor has a first arm 171 having a first end portion 172 and a second end portion 173 and a second arm 174 having a first end portion 175 and a second end portion 176. The first arm 171 is hinged or pivotally affixed to the second arm 174 at the first end portion 172 of said first arm and the first end portion 175 of said second arm. The first and second arms 171 and 174, respectively, are pivotally affixed to each other by any suitable pivot means 177. The first and second arms 171 and 174 are preferably pivotally affixed to each other in a manner whereby in the fully retracted position thereof they are positioned adjacent to each other in parallel in coplanar relation in a plane substantially parallel to the plane of the back 162 of the casing and in a fully expanded condition they are positioned end-to-end in coplanar relationship in a plane substantially parallel to the plane of one of the sides of the casing.

The second end portion 173 of the first arm 171 is pivotally affixed to the casing at a selected portion of the back 162 thereof. The second end portion 176 of the second arm 174 is pivotally affixed to the inner end portion 179 of the support arm 163. Any suitable pivot means 182 may be utilized to pivotally affix the first arm to the back 162 of the casing and any suitable pivot means 183 may be utilized to pivotally affix the second arm 174 to the support arm 163. Thus, a force applied to the second arm 174 by the support arm 163 in a direction away from the back 162, such as when the equipment unit 164 is pulled out of the casing, pivotally moves the first and second arms 171 and 174 to increase the angle between them. A force applied to the second arm 174 by the support arm 163 in a direction toward the back 162, such as when the equipment unit 164 is returned to or pushed into the casing, pivotally moved the first and second arms 171 and 174 to decrease the angle between them.

A flexible cable 184 may be supported on either one of the first and second arms 171 and 174, although it may be supported on both of said arms, and extends to the equipment unit 164 mounted on the support arms.

Figure 1:
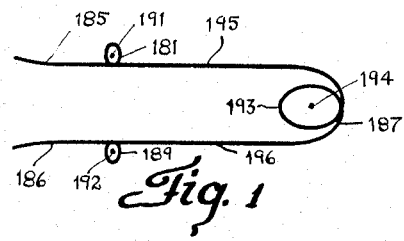
FIG. 1 is a side view of an embodiment of the cable support for supporting a flexible cable in disentangled form of the present invention.

The cable support of FIGS. 1, 2, 3 and 4 supports the flexible cable 184 in disentangled form and comprises a length of resilient wire having spaced ends 185 and 186 and a center area 187. The wire is looped about itself in the area of each of its ends in substantially flat loops 188 and 189, respectively, of substantially parallel coplanar disposition. Each of the end loops 188 and 189 has an axis 191 and 192, respectively, as shown in FIG. 1; the end loop 188 having an axis 191 and the end loop 189 having an axis 192.

Figure 2:
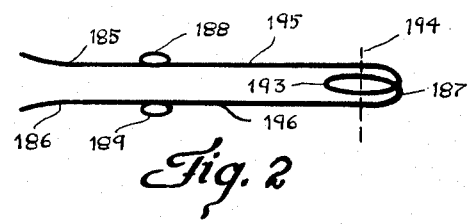
FIG. 2 is a top view of the embodiment of FIG. 1.

The wire is looped about itself in the area of its center 187 in a substantially flat loop 193 of substantially one and one-half turns substantially coplanar with the planes of the end loops 188 and 189 and has an axis 194, as shown in FIGS. 1 and 2. The looping of the wire about itself in the area of its center 187 in the loop 194 forms said wire in a substantially U-shaped configuration having spaced arms 195 and 196 extending from the common center loop 193 to each end; the arm 195 extending from the common center loop 193 to the end 185 and the arm 196 extending from said common center loop to the end 186.

The arm 195 is affixed in the area of its end 185 between said end and the loop 188 formed in the area of said end to the second arm 174 of the cable retractor. The arm 196 is affixed in the area of its end 186 between said end and the loop 189 formed in the area of said end to the equipment unit 164. Thus, when the equipment unit 164 and the casing, and thus the cable retractor, are moved relative to each other, the ends 185 and 186 of the wire are similarly moved relatively to each other, so that if the equipment unit is pulled from the casing, the distance between said equipment unit and said casing increases and the distance between the ends 185 and 186 of the wire also increases. If the equipment unit is pushed into the casing, the distance between said equipment unit and said casing decreases and the distance between the ends 185 and 186 of the wire also decreases.

The end loops 188 and 189 are expanded along their axes 191 and 192, respectively, when the equipment unit 164 and the back 162 of the casing are moved away from each other and said end loops are contracted along their axes when said equipment unit and said back of said casing are moved toward each other. The common center loop 193 is expanded along its axis 194 to a greater extent than the end loops when the equipment unit 164 and the back 162 of the casing are moved away from each other and said common center loop is contracted along its axis to a greater extent than the end loops when said equipment unit and said back of said casing are moved toward each other. When the back of the equipment unit 164 is moved up or down relative to the back 162 of the casing, the end loops 188 and 189 of the cable support wind or twist about their axes or unwind or untwist about their axes depending upon whether the back of the equipment unit is moving away from or toward the back of the casing.

The flexible cable 184 is supported at fixed points on the cable support by any suitable fastening means. The end loops 188 and 189 permit flexing and prevent excessive bending at the ends during use which would cause the wire to snap. The flexible cable 184 is supported by the cable support in disentangled form and moves smoothly with the cable retractor without kinking. The cable support prevents stress or strain on the supported flexible cable 184.

While the invention has been described by means of specific examples and in specific embodiments, we do not wish to be limited thereto, for obvious modifications will occur to those skilled in the art without departing from the spirit and scope of the invention.

What we claim is:

1. A cable support for supporting a flexible cable in disentangled form comprising, in combination,
a first support area and a second support area spaced from said first support area, one of said first and second support areas being adapted to move relative to the other;
a substantially flexible cable extending from said first support area to said second support area in the space between said first and second support areas; and
cable supporting means comprising a length of resilient wire having spaced ends and a center area, said wire being looped about itself in the area of each of its ends, said wire being looped about itself in the area of its center in a substantially flat loop having an axis to form a substantially U-shaped configuration having spaced arms extending from the common center loop to each end, means for affixing one of said arms in the area of its end between said end and the loop formed in the area of said end to said first support area, means for affixing the other of said arms in the area of its end between said end and the loop formed in the area of said end to said second support area so that when said first and second support areas are moved relative to each other the ends of said wire are similarly moved relative to each other and the common center loop is expanded along its axis in one direction of relative movement of said first and second support areas and said common center loop is contracted along its axis in the opposite direction of relative movement of said first and second support areas, and means for supporting said cable at fixed points on said cable supporting means.

2. A cable support for supporting a flexible cabe in disentangled form comprising, in combination,
a first support area and a second support area spaced from said first support area, one of said first and second support areas being adapted to move relative to the other;
a substantially flexible cable extending from said first support area to said second support area in the space between said first and second support areas; and
cable supporting means comprising a length of resilient wire having spaced ends and a center area, said wire being looped about itself in the area of each of its ends in substantially flat loops of substantially parallel coplanar disposition, each of said end loops having an axis, said wire being looped about itself in the area of its center in a substantially flat loop substantially coplanar with the planes of said end loops and having an axis to form a substantially U-shaped configuration having spaced arms extending from the common center loop to each end, means for affixing one of said arms in the area of its end between said end and the loop formed in the area of said end to said first support area, means for affixing the other of said arms in the area of its end between said end and the loop formed in the area of said end to said second support area so that when said first and second support areas are moved relative to each other the ends of said wire are similarly moved relative to each other, the end loops are expanded along their axes in one direction of relative movement of said first and second support areas and said end loops are contracted along their axes in the opposite direction of relative movement of said first and second support areas, and the common center loop is expanded along its axis in said one direction of relative movement of said first and second support areas and said common center loop is contracted along its axis in said opposite direction of relative movement of said first and second support areas, and means for supporting said cable at fixed points on said cable supporting means.

3. A cable support for supporting a flexible cable in disentangled form comprising, in combination,
a first support area and a second support area spaced from said first support area, one of said first and second support areas being adapted to move relative to the other;

a substantially flexible cable extending from said first support area to said second support area in the space between said first and second support areas; and cable supporting means comprising a length of resilient wire having spaced ends and a center area, said wire being looped about itself in the area of each of its ends in substantially flat loops of substantially parallel coplanar disposition, each of said end loops having an axis, said wire being looped about itself in the area of its center in a substantially flat loop of substantially 1½ turns substantially coplanar with the planes of said end loops and having an axis to form a substantially U-shaped configuration having spaced arms extending from the common center loop to each end, means for affixing one of said arms in the area of its end between said end and the loop formed in the area of said end to said first support area, means for affixing the other of said arms in the area of its end between said end and the loop formed in the area of said end to said second support area so that when said first and second support areas are moved relative to each other the ends of said wire are similarly moved relative to each other, the end loops are expanded along their axes in one direction of relative movement of said first and second support areas and said end loops are contracted along their axes in the opposite direction of relative movement of said first and second support areas, and the common center loop is expanded along its axis in said one direction of relative movement of said first and second support areas and said common center loop is contracted along its axis in said opposite direction of relative movement of said first and second support areas, and means for supporting said cable at fixed points on said cable supporting means.

4. A mounting arrangement for an equipment unit having a flexible cable connected thereto comprising, in combination, a casing having spaced opposite substantially parallel sides and a back substantially perpendicular to said sides and joined at one end to one side and joined at the other end to the other side;

a pair of support arms adapted to support an equipment unit between them;

mounting means slidably mounting one of said support arms on one of said sides and the other of said support arms on the other of said sides with each support arm in substantially adjacent and parallel relaiton to the corresponding side and slidable in directions toward and away from the back of said casing:

a cable retractor comprising a first arm having at first end portion and a second portion, a second arm having a first end portion and a second end portion, means hinging said first and second arms to each other at their first end portions, means for supporting said flexible cable on one of said first and second arms, means for pivotally supporting said first arm at its second end portion on the back of said casing, and means for pivotally supporting said second arm at its second end portion on one of said support arms in a manner whereby a force applied to said second arm by said one of said support arms in a direction away from said back pivotally moves said first and second arms to increase the angle between them and a force applied to said second arm by the said one of said support arms in a direction toward said back pivotally moves said first and second arms to decrease the angle between them; and cable supporting means for supporting said flexible cable in disentangled form comprising a resilient wire arrangement having spaced arms extending from a common point, one of said arms being affixed to the second arm of said cable retractor and the other of said arms being affixed to said equipment unit, said cable supporting means supporting said cable at fixed points thereof.

5. A mounting arrangement for an equipment unit having a flexible cable connected thereto comprising, in combination, a casing having spaced opposite substantially parallel sides and a back substantially perpendicular to said sides and joined at one end to one side and joined at the other end to the other side;

a pair of support arms adapted to support an equipment unit between them;

mounting means slidably mounting one of said support arms on one of said sides and the other of said support arms on the other of said sides with each support arm in substantially adjacent and parallel relation to the corresponding side and slidable in directions toward and away from the back of said casing;

a cable retractor comprising a first arm having a first end portion and a second end portion, a second arm having a first end portion and a second end portion, means hinging said first and second arms to each other at their first end portions, means for supporting said flexible cable on one of said first and second arms, means for pivotally supporting said first arm at its second end portion on the back of said casing, and means for pivotally supporting said second arm at its second end portion on one of said support arms in a manner whereby a force applied to said second arm by said one of said support arms in a direction away from said back pivotally moves said first and second arms to increase the angle between them and a force applied to said second arm by the said one of said support arms in a direction toward said back pivotally moves said first and second arms to decrease the angle between them; and cable supporting means comprising a length of resilient wire looped about itself in the area of its center to form a substantially U-shaped configuration having spaced arms extending from the common center loop, one of said arms being affixed to the second arm of said cable retractor and the other of said arms being affixed to said equipment unit, said cable supporting means supporting said cable at fixed points thereof.

6. A mounting arrangement for an equipment unit having a flexible cable connected thereto comprising, in combination, a casing having spaced opposite substantially parallel sides and a back substantially perpendicular to said sides and joined at one end to one side and joined at the other end to the other side;

a pair of support arms adapted to support an equipment unit between them;

mounting means slidably mounting one of said support arms on one of said sides and the other of said support arms on the other of said sides with each support arm in substantially adjacent and parallel relation to the corresponding side and slidable in directions toward and away from the back of said casing;

a cable retractor comprising a first arm having a first end portion and a second end portion, a second arm having a first end portion and a second end portion, means hinging said first and second arms to each other at their first end portions, means for supporting said flexible cable on one of said first and second arms, means for pivotally supporting said first arm at its second end portion on the back of said casing, and means for pivotally supporting said second arm at its second end portion on one of said support arms in a manner whereby a force applied to said second arm by said one of said support arms in a direction away from said back pivotally moves said first and second arms to increase the angle between them and a force applied to said second arm by the said one of said support arms in a direction toward said back pivotally moves said first and second arms to decrease the angle between them; and cable supporting means comprising a length of resilient wire having spaced ends and a center area, said wire being looped about itself in the area of each of its ends and in the area of its center to form a substantially U-shaped configuration having spaced arms extending from the common center loop to each end, means for affixing one of said arms in the area of its end between said end and the loop formed in the area of said end to the second arm of said cable retractor, means for affixing the other of said arms in the area of its end between said end and the loop formed in the area of said end to said equipment unit, and means for supporting said cable at fixed points on said cable supporting means.

7. A mounting arrangement for an equipment unit having a flexible cable connected thereto comprising, in combination, a casing having spaced opposite substantially parallel sides and a back substantially perpendicular to said sides and joined at one end to one side and joined at the other end to the other side;

a pair of support arms adapted to support an equipment unit between them;

mounting means slidably mounting one of said support arms on one of said sides and the other of said support arms on the other of said sides with each support arm in substantially adjacent and parallel relation to the corresponding side and slidable in directions toward and away from the back of said casing;

a cable retractor comprising a first arm having a first end portion and a second end portion, a second arm having a first end portion and a second end portion, means hinging said first and second arms to each other at their first end portions, means for supporting said flexible cable on one of said first and second arms, means for pivotally supporting said first arm at its second end portion on the back of said casing, and means for pivotally supporting said second arm in its second end portion on one of said support arms in a manner whereby a force applied to said second arm by said one of said support arms in a direction away from said back pivotally moves said first and second arms to increase the angle between them and a force applied to said second arm by the said one of said support arms in a direction toward said back pivotally moves said first and second arms to decrease the angle between them; and cable supporting means comprising a length of resilient wire having spaced ends and a center area, said wire being looped about itself in the area of each of its ends, said wire being looped about itself in the area of its center in a substantially flat loop having an axis to form a substantially U-shaped configuration having spaced arms extending from the common center loop to each end, means for affixing one of said arms in the area of its end between said end and the loop formed in the area of said end to the second arm of said cable retractor, means for affixing the other of said arms in the area of its end between said end and the loop formed in the area of said end to said equipment unit so that when said equipment unit and said casing are moved relative to each other the ends of said wire are similarly moved relative to each other and the common center loop is expanded along its axis in one direction of relative movement of said equipment unit and said casing and said common center loop is contracted along its axis in the opposite direction of relative movement of said equipment unit and said casing, and means for supporting said cable at fixed points on said cable supporting means.

8. A mounting arrangement for an equipment unit having a flexible cable connected thereto comprising, in combination, a casing having spaced opposite substantially parallel sides and a back substantially perpendicular to said sides and joined at one end to one side and joined at the other end to the other side;

a pair of support arms adapted to support an equipment unit between them;

mounting means slidably mounting one of said support arms on one of said sides and the other of said support arms on the other of said sides with each support arm in substantially adjacent and parallel relation to the corresponding side and slidable in directions toward and away from the back of said casing;

a cable retractor comprising a first arm having a first end portion and a second end portion, a second arm having a first end portion and a second end portion, means hinging said first and second arms to each other at their first end portions, means for supporting said flexible cable on one of said first and second arms, means for pivotally supporting said first arm at its second end portion on the back of said casing, and means for pivotally supporting said second arm at its second end portion on one of said support arms in a manner whereby a force applied to said second arm by said one of said support arms in a direction away from said back pivotally moves said first and second arms to increase the angle between them and a force applied to said second arm by the said one of said support arms in a direction toward said back pivotally moves said first and second arms to decrease the angle between them; and cable supporting means comprising a length of resilient wire having spaced ends and a center area, said wire being looped about itself in the area of each of its ends in substantially flat loops of substantially parallel coplanar disposition, each of said end loops having an axis, said wire being looped about itself in the area of its center in a substantially flat loop substantially coplanar with the planes of said end loops and having an axis to form a substantially U-shaped configuration having spaced arms extending from the common center loop to each end, means for affixing one of said arms in the area of its end between said end and the loop formed in the area of said end to the second arm of said cable retractor, means for affixing the other of said arms in the area of its end between said end and the loop formed in the area of said end to said equipment unit so that when said equipment unit and said casing are moved relative to each other the ends of said wire are similarly moved relative to each other, the end loops are expanded along their axes in one direction of relative movement of said equipment unit and said casing and said end loops are contracted along their axes in the opposite direction of relative movement of said equipment unit and said casing, and the common center loop is expanded along its axis in said one direction of relative movement of said equipment unit and said casing and said common center loop is contracted along its axis in said opposite direction of relative movement of said equipment unit and said casing, and means for supporting said cable at fixed points on said cable supporting means.

References Cited by the Examiner
UNITED STATES PATENTS 977,349 11/1910 Wagner _____ 312—338
1,556,684 10/1925 Gardner _____ 312—273

(Other references on following page)

UNITED STATES PATENTS

| | | | |
|---|---|---|---|
| 2,054,843 | 9/1936 | Weber | 312—273 |
| 2,676,866 | 4/1954 | Woodin | 312—333 |
| 2,789,024 | 4/1957 | Heisler | 312—333 |
| 2,865,979 | 12/1958 | Klassen | 174—52 X |
| 3,017,226 | 1/1962 | Sloyan | 308—3 |
| 3,053,581 | 9/1962 | Werner | 308—3 |
| 3,059,986 | 10/1962 | Miller | 312—338 |

FOREIGN PATENTS

| | | |
|---|---|---|
| 682,495 | 10/1939 | Germany. |
| 732,501 | 6/1955 | Great Britain. |
| 103,556 | 2/1924 | Switzerland. |

CLAUDE A. LE ROY, *Primary Examiner.*

CHANCELLOR E. HARRIS, FRANK B. SHERRY, *Examiners.*

FRANK DOMOTOR, *Assistant Examiner.*